United States Patent Office 3,518,300
Patented June 30, 1970

3,518,300
PREPARATION OF o-PHENETHYL
BENZOIC ACID
Shrikant V. Dighe, Silver Spring, Md., assignor to W. R. Grace & Co., New York, N.Y., a corporation of Connecticut
No Drawing. Filed May 2, 1967, Ser. No. 635,374
Int. Cl. C07c 63/00
U.S. Cl. 260—515                3 Claims

ABSTRACT OF THE DISCLOSURE

An o-phenethyl benzoic acid is prepared by reacting hydrogen with either benzal phthalide or benzyl phthalide in an acid medium in the presence of a platinum metal catalyst.

The present invention relates to a novel and useful hydrogenation process. More particularly, it relates to a hydrogenation process for the preparation of o-phenethyl benzoic acid.

Dibenzosuberone is an important intermediate in the synthesis of antidepressant drugs. Generally, it is obtained by the cyclization of o-phenethyl benzoic acid. The o-phenethyl benzoic acid has generally been obtained by a quite complicated hydrogenation and hydrogenolysis reaction. Accordingly, it is an object of the present invention to produce an o-phenethyl benzoic acid from a benzyl phthalide or a benzal phthalide by a new and novel process. Another object is to produce the compound by a relative simple and inexpensive process as compared to the prior art processes. Other objects will become apparent as the description of the invention proceeds.

These objects are accomplished by the present invention which provides a hydrogenation process for the preparation of an o-phenethyl benzoic acid which comprises reacting a compound selected from the group consisting of a benzal phthalide and a benzyl phthalide with hydrogen in an acid medium in the presence of a platinum metal catalyst and thereafter recovering the o-phenethyl benzoic acid.

In a preferred embodiment of the present invention benzal phthalide is utilized as the starting material and platinum is employed as the catalyst at a temperature of from about 20° C. to about 100° C.

The hydrogenation reaction for benzyl phthalide or benzal phthalide is shown below:

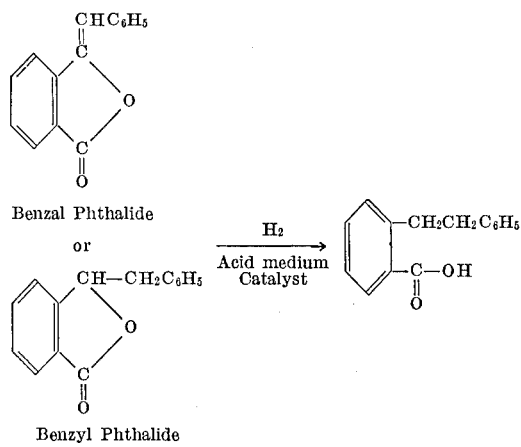

The terms "a benzal phthalide" and "a benzyl phthalide" are used to include compounds containing substituents on the ring of the benzoic acid. For example, the ring may contain alkoxy groups, alkyl groups, amino groups, dialkylamino groups, alkamino groups and the like since the substituents do not interfere with the course of the hydrogenation reaction. The "acid medium" employed in the present invention may be provided by any acid in solution. Preferably, it is provided by an organic acid which acts as a solvent for the system such as acetic acid which is a liquid at the temperature and pressure employed. Propionic acid and butyric acid may also be used. Benzoic acid may likewise be utilized if used with a solvent for the system. Other acids are also suitable and may be selected as desired.

The platinum metals are a well known group of metals consisting of platinum, ruthenium, rhodium, palladium, osmium and iridium. The metals may be deposited of any of the conventional carriers such as alumina, silica, charcoal and the like. A particularly preferred catalyst is 5% platinum on charcoal which is available commercially. Mixtures of the catalysts may also be used.

The platinum metals are generally employed in amounts of from about 1% to about 20%, preferably 3% to 10% by weight, based on the weight of the catalyst base. The amount of catalyst and base employed is generally in the amount of from 1% to about 25% of weight based on the weight of the phthalide starting material. More commonly from about 4% to about 8% of the catalyst and base will be employed.

The reaction may be carried out under ambient conditions, i.e., room temperatures and atmospheric pressure. However, to hasten the reaction a pressure of from about 5 to 50 p.s.i.g. preferably 15 to 25 p.s.i.g. is generally utilized with temperatures to about 200° C. For convenience the reaction is generally carried out within the temperature range of from about 20° C. to about 100° C.

The following examples are given to illustrate the invention and are not intended to limit it in any manner.

EXAMPLE 1

*Materials.*—22.2 g. (0.1 M) benzal phthalide; 2.0 g. 5% Pt on charcoal; and 125 ml. glacial acetic acid.

*Procedure.*—The above materials are placed in a pressure reaction bottle of a conventional Parr apparatus. The bottle is purged three times with nitrogen at 20 p.s.i.g. and then twice with hydrogen at 20 p.s.i.g. It is then connected to a source of hydrogen at 20 p.s.i.g. and the contents agitated for 72 hours at room temperature. The bottle is vented to the atmosphere and the contents filtered. The clear filtrate is concentrated with a conventional rotary evaporator to remove nearly all of the acetic acid. A brownish, thick, viscous liquid is obtained. It is dissolved in ether and the ether solution extracted with 5% sodium bicarbonate solution to solubilize the acid in the water. The aqueous bicarbonate layer is separated from the ether layer and then acidified with concentrated hydrochloric acid to a pH of 1 to obtain a white precipitate. The mixture is kept in a refrigerator for 3 hours, filtered, and the white precipitate collected on the filter.

The product is obtained in a yield of 20.2% but the remaining starting material may be recovered and reused. The product is recrystallized from benzene. The white recrystallized material melts at 130–131° C. Infra red analysis shows the compound to be o-phenethyl benzoic acid.

EXAMPLE 2

The procedure of Example 1 is repeated employing 0.1 M of benzyl phthalide in place of 0.1 M of benzal phthalide. The o-phenethyl benzoic acid is again obtained in a yield of about 20%.

EXAMPLE 3

The procedure of Example 1 is repeated employing 0.1 M of p-methyl-o-phenethyl benzal phthalide instead of the 0.1 M of o-phenethyl benzal phthalide. The corresponding p-methyl derivative is obtained in yields of about 20%.

Many equivalent modifications will be apparent to those skilled in the art from a reading of the foregoing without a departure from the inventive concept.

What is claimed is:

1. A hydrogenation process for the preparation of o-phenethyl benzoic acid which comprises:
   (A) reacting:
      (1) a compound selected from the group consisting of benzal phthalide and benzyl phthalide with
      (2) hydrogen in the presence of an organic carboxylic acid and from about 1% to about 20% platinum metal on charcoal, said platinum metal-charcoal catalyst being present in an amount from 1% to about 25% by weight based on the weight of said phthalide reactant;
      (3) said reacting step being effected at a pressure in the range of from about 5 to 50 p.s.i.g., and a temperature in the range of about 15° C. to about 200° C.; and
   (B) isolating o-phenethyl benzoic acid from the reaction system.

2. A hydrogenation process for the preparation of o-phenethyl benzoic acid which comprises:
   (A) reacting:
      (1) a compound selected from the group consisting of benzal phthalide and benzyl phthalide with
      (2) hydrogen in the presence of acetic acid and from about 1% to about 20% platinum metal on charcoal, said platinum metal-charcoal catalyst being present in an amount from 1% to about 25% by weight based on the weight of said phthalide reactant;
      (3) said reacting step being effected at a pressure in the range from about 5 to 50 p.s.i.g., and a temperature in the range of about 15° C. to about 200° C.; and
   (B) isolating o-phenethyl benzoic acid from the reaction system.

3. The process of claim 2 wherein the reaction is carried out at a temperature of from about 20° C. to about 100° C.

References Cited

UNITED STATES PATENTS

| | | | |
|---|---|---|---|
| 3,116,324 | 12/1963 | Dolliver | 260—515 |
| 3,369,044 | 2/1968 | Leonard et al. | 260—515 |

OTHER REFERENCES

Chemical Abstracts, vol. 59, p. 5101f, citing Graner et al. (1963).

Degering: "Organic Chemistry," College Outline Series, pp. 385–6, Barnes & Noble (N.Y.).

JAMES A. PATTEN, Primary Examiner

U.S. Cl. X.R.

260—518, 521